United States Patent
Kondo

[15] 3,707,207
[45] Dec. 26, 1972

[54] SPOT DISC BRAKES FOR VEHICLES
[72] Inventor: Toshio Kondo, Hekikai-gun, Japan
[73] Assignee: Aisin Seiki Kabushiki Kaisha, Kariya, Aichi Pref., Japan
[22] Filed: Sept. 4, 1970
[21] Appl. No.: 69,725

[30] Foreign Application Priority Data

Sept. 6, 1969 Japan.................................44/84676

[52] U.S. Cl.................................................188/71.5
[51] Int. Cl..................................................F16d 55/36
[58] Field of Search...................188/71.5, 72.4, 73.3

[56] References Cited

UNITED STATES PATENTS

| 2,304,774 | 12/1942 | Ash | 188/71.5 X |
| 2,025,098 | 12/1934 | Dudick | 188/71.5 X |
| R26,746 | 12/1969 | Hayes | 188/72.4 |
| 3,132,724 | 5/1964 | Ansteth | 188/71.5 |

Primary Examiner—George E. A. Halvosa
Attorney—Pierce, Scheffler & Parker

[57] ABSTRACT

Spot disc brakes particularly for use on heavy vehicles comprising plural brake discs, wherein one brake disc is securely mounted on a rotatable sleeve and is provided with a plurality of axially extended splines thereon, while the other brake disc is mounted slidably in its axial direction on and along the splines of said secured brake disc.

3 Claims, 4 Drawing Figures

PATENTED DEC 26 1972  3,707,207

INVENTOR.
Toshio Kondo
BY
Pierce, Schuffler & Parker
Attorneys

INVENTOR.
Toshio Kondo
BY
Pierce, Scheffler & Parker
Attorneys

SPOT DISC BRAKES FOR VEHICLES

This invention relates to spot disc brakes for vehicles, and more particularly relates to spot disc brakes of the kind in which friction pads are adapted to be brought into engagement with plural rotating discs for use on commercial vehicles, track-laying vehicles, tanks and other heavy vehicles.

In conventional disc brakes for heavy vehicles, there are provided identical axially-spaced discs on splines of a shaft driven by an engine. Upon application of the brakes all discs are required to slid on and along the said splines to frictionally engage the friction pads. This construction is undesirable because the axial sliding movement of the brake discs which are simultaneously obliged to be rotated causes damages to the splines and attendant noises upon application of the brakes. Therefore, it is preferred that the number of rotational discs which must slide on the splines be decreased by as many as possible.

It is one of the objects of this invention to provide spot disc brakes which are suitable particularly for heavy vehicles.

It is another object of this invention to provide spot disc brakes wherein the number of rotational discs which must slide on the splines may be decreased.

It is a further object of this invention to provide spot disc brakes wherein noises made upon application of the brakes are decreased to a minimum or eliminated altogether.

It is a still further object of this invention to provide spot disc brakes wherein the wear of the friction pads may be readily compensated for.

Disc brakes according to the present invention comprise a first rotational disc having a flat portion and fixed to a rotating member, and a second rotational disc axially-spaced from said first disc and mounted slidably on splines thereof. When the brake is applied the second disc is urged to move toward the flat portion of the non-sliding disc.

The various objects and advantages, and the novel details of construction of one commercially practical embodiment of the invention, will become more apparent as this description proceeds, especially when considered in connection with the accompanying drawings, in which.

Figure 1:
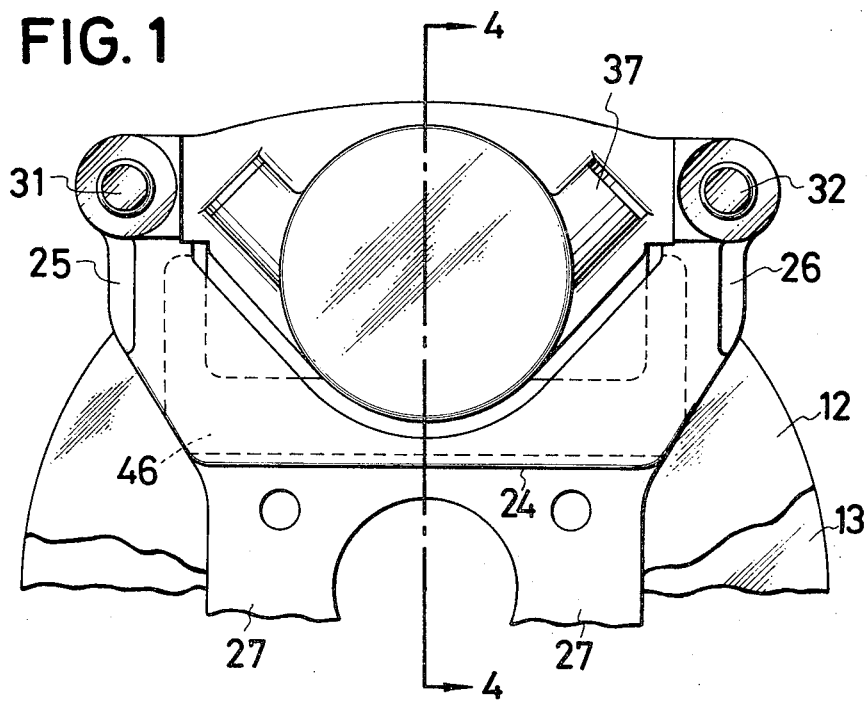
FIG. 1 is a front elevational view showing one example of a disc brake embodying the invention.
Figure 2:
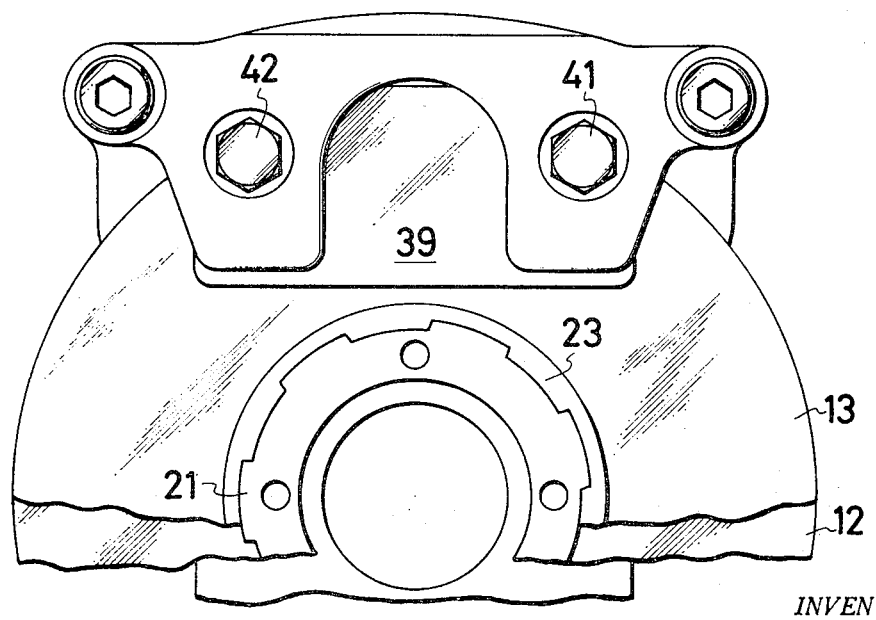
FIG. 2 is a back elevational view thereof.
Figure 3:
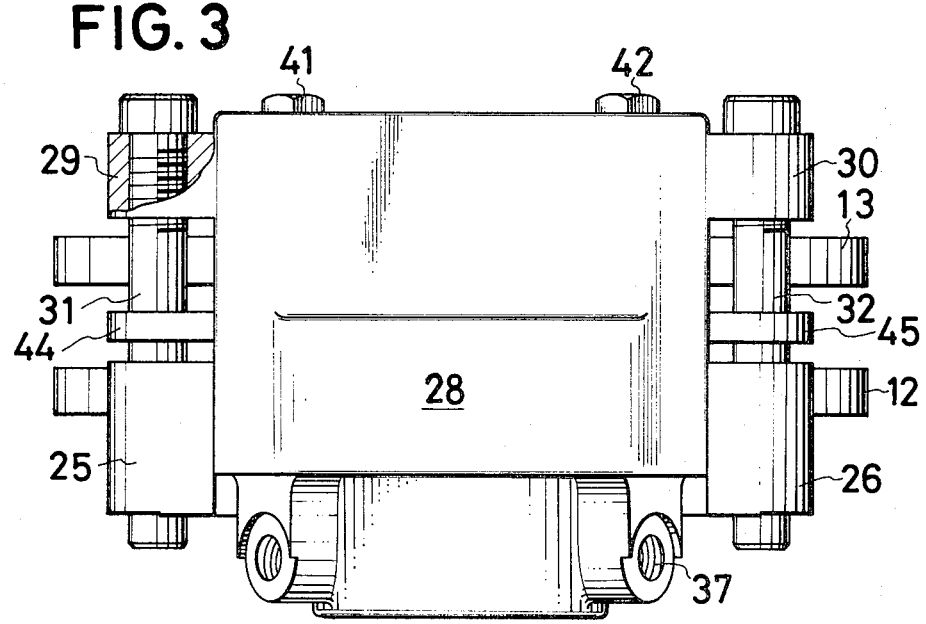
FIG. 3 is a planar view partly in section thereof.

Referring to the drawings, the brake comprises a pair of discs 10 and 11, frictional flat portions 12 and 13 thereof being axially-spaced to each other. One disc 10 is fixed at its hub portion 16 to a sleeve member 14 by bolts 17. A wheel 15 is securely mounted on the sleeve member 14 by suitable fixing means (not shown). The hub 16 of longitudinally disc 10 is longitudinally extended axially to cover a portion of the sleeve member 14 which is mounted centrally with a non-rotational axle shaft 18 by bearings 19 and 20, the hub portion 16 being parallel to the axis of the axle shaft 18. There are provided a plurality of axially-extending splines 21 on the hub 16 of the disc 10 with which a hub 22 of the other disc 11 is adapted to be engaged by its cooperating splined portions 23, said splined portions 23 being axially formed on the inner periphery of the hub 22. It will be noted that upon rotation of the wheel 15 the discs 10 and 11 are caused to rotate therewith around the axle shaft 18.

The numeral 24 denotes a carrier comprising diametrically-opposed arms 25 and 26 and fixed at its radially-extending lugs 27 to the axle shaft 18 by bolts (not shown).

A cylinder housing 28 includes a pair of diametrically-opposed lugs 29 and 30. One lug 29 is secured at its internally screw-threaded hole on a pin 31 on which one arm 25 of the carrier 24 is mounted slidably in the axial direction thereof, whilst the other lug 30 is secured at its internally screw-threaded hole on a parallel pin 32 on which the other arm 26 of the carrier 24 is mounted slidably in the axial direction thereof. The cylinder housing 28 is thus supported on the carrier 24 by the parallel pins 31 and 32, and located above the outer peripheries of the flat plates 12 and 13 of the discs in a straddling manner.

An internal recess or bore 33 is provided on an end wall 34 of the cylinder housing 28 adjacent to the flat portion 12 of the non-slidable disc 10. Within the recess 33, there is slidably and sealingly fitted a hydraulic piston 35. Between the end wall 34 and the piston 35, there is constituted a hydraulic chamber 36 to which fluid under pressure is supplied from a master cylinder (not shown) through an inlet port 37 when the brake is applied.

A first friction pad 38 is provided between the flat portion 12 of the rotational disc 10 and the hydraulic piston 35 in the axial alignment, and mounted slidably in the brake disc axial direction by an inner rib 46 of the carrier 24. A second friction pad 39 is provided between the flat plate portion 13 of the axially-slidable disc 11 and and end wall 40 opposite to the end wall 34 in the axial alignment, and fixed to the end wall 40 by bolts 41 and 42. Between the flat portions 12 and 13 of the discs, there is provided an intermediate friction pad 43 which comprises diametrically-opposed pair of ears 44 and 45 supported by and slidable along the parallel pins 31 and 32.

Figure 4:
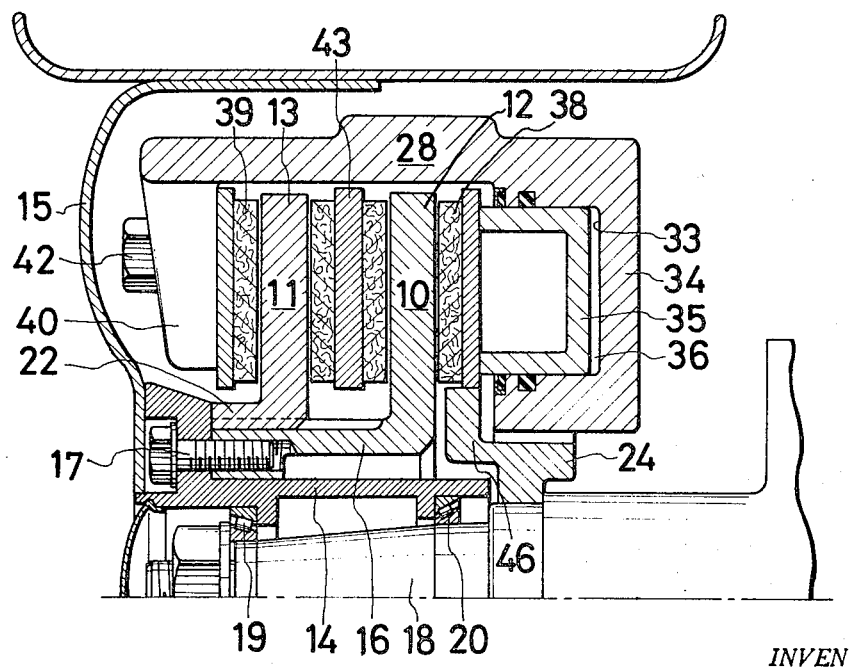
FIG. 4 is an elevational view, in vertical section taken along the plane indicated by line 4—4 in FIG. 1 as view in the arrow direction.

In operation, when the hydraulic pressure is supplied from the master cylinder to the fluid chamber 36 the piston 35 is urged to move in the left direction in FIG. 4 whereby the first friction pad 38 is urged into frictional engagement with the flat portion 12 of the rotating and non-slidable disc 10, while the reaction of this movement of the piston 35 operates in the opposite direction to move the cylinder housing 28 whereby the second friction pad 39 is urged into frictional engagement with the flat plate 13 of the rotating and axially-slidable disc 11. The disc 11 is thus urged to slide in its axial direction along the splines 21 of the disc 10 and to permit the intermediate friction pad 43 to frictionally engage the rotating flat plate 12 of the disc 10 so that the discs 10 and 11 are frictionally engaged with the three friction pads 38, 39 and 43 to apply the brakes.

It should be noted that some modifications of the above-described embodiment may be represented. For instance, the axially slidable disc 11 may be adapted to be slidable on splines provided on the sleeve 14 in place of those on the non-slidable disc 10. Alternatively, the other disc 11 can be fixed to the rotational sleeve 14 while disc 10 is adapted to be axially slidable on and along the splines provided on the sleeve. In addition, a key connection may be provided between the driving and driven members, for example, between the non-slidable disc 10 and the slidable disc 11 in place of the splines.

According to the features of this invention, the brake effect is heightened and no noises occur since the axial of the discs is decreased as compared with the conventional disc brakes. In addition, the wear on friction pads may be readily compensated for by virtue of provision of the axially slidable disc.

What is claimed is:

1. Spot disc brakes for vehicles comprising,
   a non-rotatable shaft,
   a sleeve mounted on said shaft through bearings and rotatable with a wheel of the vehicle,
   a first brake disc fixed to said rotatable sleeve and provided with splines,
   a second brake disc mounted on the splines of said first brake disc and slidable in its axial direction and rotatable with said first brake disc,
   supporting pins mounted on a fixed member of the vehicle,
   hydraulic actuating means straddling over the outer peripheries of said discs and slidably supported by said supporting pins,
   a first friction pad frictionally engageable with said first brake disc by said hydraulic actuating means,
   a second friction pad frictionally engageable with said second brake disc by said hydraulic actuating means, and
   a further friction pad provided between said first and second brake discs and slidably supported by said supporting pins, said further friction pad being axially slidable by said second brake disc for frictionally engaging with said first and second brake discs.

2. The spot disc brakes as defined in claim 1 and wherein said hydraulic actuating means comprises a cylinder housing straddling over the outer peripheries of said discs, and a hydraulic piston slidably fitted in said cylinder housing.

3. The spot disc brakes as defined in claim 1 and wherein said first friction pad is supported and axially guided by an inner rib provided on said fixed member.

* * * * *